United States Patent [19]
Chen et al.

[11] Patent Number: 5,641,859
[45] Date of Patent: Jun. 24, 1997

[54] WATER-SOLUBLE SELF-ACID-DOPED POLYANILINE, METHOD OF PREPARATION THEREOF, AND POLYMER BLENDS MADE THEREFROM

[75] Inventors: Show-An Chen; Gue-Wuu Hwang, both of Hsinchu, Taiwan

[73] Assignee: National Science Council of Taiwan, Taipei, Taiwan

[21] Appl. No.: 501,593

[22] Filed: Jul. 12, 1995

[51] Int. Cl.$^6$ ............................................. C08G 73/00
[52] U.S. Cl. ........................... 528/422; 528/373; 528/391
[58] Field of Search ............................. 528/422, 373, 528/391

[56] References Cited

U.S. PATENT DOCUMENTS 5,232,631 8/1993 Cao et al. .............................. 252/500

OTHER PUBLICATIONS

Show–An Chen et al. "Synthesis of Water–Soluble Self-–Acid–Doped Polyaniline" J. Am. Chem. Soc./ Aug. 1994/ 116, 7939–7940.

P. Hany et al., "Polyanilines with Covalently Bonded Alkyl Sulfonates as Doping Agent. Synthesis and Properties", Synthetic Metals,/ 1989/ 369–378.

*Primary Examiner*—W. Robinson H. Clark
*Attorney, Agent, or Firm*—W. Wayne Liauh

[57] ABSTRACT

The present invention discloses a water-soluble self-acid-doped polyaniline, and its sodium salt, which can be cast into free-standing films from their aqueous solutions. A process for preparing a water-soluble self-acid-doped polyaniline is also disclosed, which comprises reacting a polyaniline with a strong base to convert the amino nitrogen thereof to anionic nitrogen; reacting sultone with the anionic nitrogen to form a side chain alkanesulfonic acid group; doping with protonic acid to form precipitate; dissolving (undoping) the precipitate in an alkaline aqueous solution; removing excess alkali from the alkaline aqueous solution; and contacting the resulting aqueous solution with a $H^+$-type ion exchange resin. Moreover, an aqueous solution of the present water-soluble self-acid-doped PAn can be easily mixed with an additional water soluble polymer or polymer emulsion, which can then be cased into a polymer blend film having improved mechanical properties and coupling strength to a substrate.

15 Claims, 3 Drawing Sheets

WATER-SOLUBLE SELF-ACID-DOPED POLYANILINE, METHOD OF PREPARATION THEREOF, AND POLYMER BLENDS MADE THEREFROM

BACKGROUND OF THE INVENTION

Polyaniline (PAn) is stable in air and has a relatively low manufacturing cost. In addition, PAn has been found to be very useful in various applications, such as: material for making battery electrodes due to its oxidation-reduction properties, material for making pH sensor due to its proton exchange property, material for making a display element due to its electrochromic property, and electro-magnetic interference shielding and antistatic coating. Moreover, in 1990, Japan Bridgestone Co. of Japan [(U.S. Pat. No. 5,066,556 (1991); U.S. Pat. No. 4,957,833 (1990)] used polyaniline deposited on a current collector as working electrode in conjunction with a lithium electrode to produce a button battery with a discharge capacity of 80 Ahr/kg. Ricoh Co. of Japan [U.S. Pat. No. 4,999,263 (1991); U.S. Pat. No. 4,948,685 (1990)] used a polyaniline membrane of 0.05 mm thick deposited on a porous metallic membrane to produce a film-type battery with outside dimensions of 50 mm long, 50 mm wide and 0.9 mm thick. Sony Co. of Japan (Modern Plastics Int., Aug. (1991) 33) utilized polyaniline as an antistatic layer on a high density magnetic memory disc (4M).

Polyaniline (PAn) basically has a structure which can be represented by the following formula (Faraday Discuss Chem. Soc., 88 (1989) 317):

acid) (PAPSA), by reaction of leucoemeraldine base (a fully reduced PAn) with propanesultone [Bergeron, J. Y.; Chevalier, J. W.; Dao, L. H. J. Chem. Soc., Chem. Commun. 1990, 180–182]. However. the PAPSA is supposed to have no imine nitrogen (—N=) to allow self-acid-doping, although they have claimed the appearance of a strong absorption band at about 900 nm, which always appears for protonic acid-doped PAn. Recently, IBM reported that a water-soluble poly(aniline-co-N-(4-sulfophenyl)aniline) has been synthesized by copolymerization [Macromolecules 1994, 27, 3625–3631]. However, this product was found via elemental analysis that it is not self-acid-doped but is HCl-doped PAn. In addition, this PAn is only soluble in aqueous $NH_4OH$ solution and is not soluble in water.

DETAILED DESCRIPTION OF THE INVENTION

Figure 1:
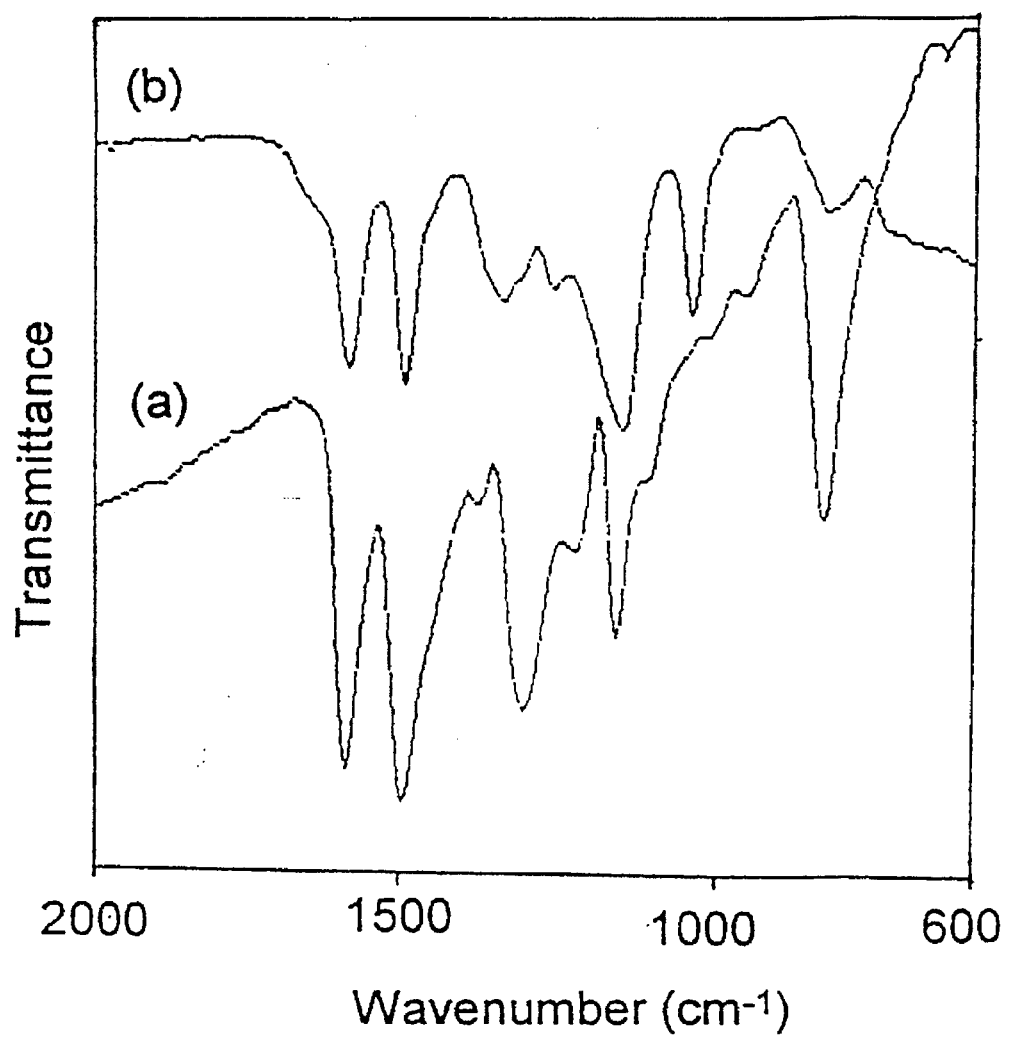
FIG. 1 shows IR spectra of polyaniline (curve a) and poly(aniline-co-sodium N-propanesulfonate aniline) (curve b).

Here, we report a successful preparation of a novel water-soluble self-acid-doped polyaniline, and its sodium

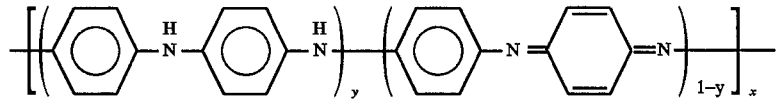

wherein $0 \leq y \leq 1$. It is termed leucoemeraldine, emeraldine and pernigraniline, when y is 0, 0.5 and 1, respectively.

A conjugated conducting polymer in general has a conductivity of about $10^{-12} \sim 10^{-19}$ S/cm in the undoped state, which is increased to a value of about $10^0 \sim 10^5$ S/cm after the conjugated conducting polymer is oxidatively doped. Polyaniline (PAn) is different from other conjugated conducting polymers in that it can be doped to become a conducting form without requiring their $\pi$-electrons to be changed through protonation by exposure to an appropriate protonic acid in aqueous solution [Chiang, J. C.; MacDiarmid, A. G. Synth. Met. 1986, 13, 193–205]. Yue and Epstein have synthesized a protonic acid self-doped PAn by reaction of emeraldine base with fuming sulfuric acid to give a sulfonic acid ring-substituted PAn having a conductivity of 0.1 S/cm; however, it is insoluble in the acid form (doped) and can be made soluble only when it is converted to a salt form (undoped) [Yue, J.; Epstein, A. J. J. Am. Chem. Soc. 1990, 112, 2800–2801. Yue, J.; Wang, Z. H.; Cromack, K. R.; Epstein, A. J.; MacDiarmid, A. G. J. Am. Chem. Soc. 1991, 113, 2665–2671]. Genies et al. also have attempted to synthesize a self-doped PAn by reaction of emeraldine base directly with propane or butane sultone [Hany, P.; Genies, E. M.; Santier, C. Synth. Met. 1989, 31,369–378]. However, the reaction product has a very poor solubility and low conductivity ($\sim 10^{-9}$ S/cm). So far, all the self-acid-doped PAns reported in the prior art are insoluble, and thus their applications are limited. Dao and co-workers have synthesized a water soluble polyaniline, poly(aniline-propanesulfonic salt, which can be cast into free-standing films from their aqueous solutions. In one of the preferred embodiments of the present invention, poly(aniline-co-N-propanesulfonic acid-aniline) (PAPSAH) was synthesized and a film formed from its aqueous solution exhibited a conductivity of $3 \times 10^{-2}$ S/cm without external doping. This conductivity is sufficiently high so that the water-soluble self-acid-doped polyaniline disclosed in the present invention can be used as an electromagnetic interference shielding (EMI shielding) ($10^{-3}$ S/cm), electrostatic-discharge (ESD) ($10^{-5}$ S/cm) or antistatic ($10^{-9}$ S/cm) material. Moreover, an aqueous solution of the water-soluble serf-acid-doped PAn of the present invention can be easily mixed with a water soluble polymer or polymer emulsion, which can then be casted into a polymer blend film having improved mechanical properties and adhesion strength to a substrate, and thus facilitating the workability of the water-soluble self-acid-doped PAn of the present invention in various applications.

A preferred process for preparing a water-soluble self-acid-doped polyaniline in accordance with the present invention comprises the following steps:

a) dissolving a polyaniline having formula (A) as follows in an organic solvent:

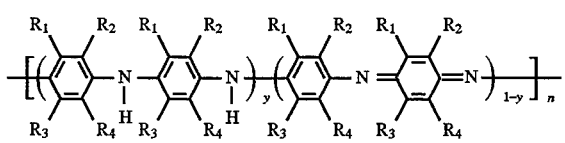

wherein $R_1$, $R_2$, $R_3$, $R_4$ are independently —H, —CH$_3$, —C$_2$H$_5$, —C$_3$H$_7$, —OR$_7$, —SR$_7$, —F, —Cl, —Br, —I, —COR$_7$, —NHCOR$_7$, —NO$_2$, —COOR$_7$ or —CN, wherein $R_7$ is a lower alkyl, aryl or aryl (lower alkyl); $0<y<1$; and n is an integer equal to or greater than 2, and preferably less than 5000;

b) adding a strong base, such as NaH and alkali metal hydroxides, preferably NaH, into the resulting organic solution of step a), and said strong base reacting with the polyaniline so that the amino nitrogen of said polyaniline is converted to artionic nitrogen;

c) adding sultone into the resulting reaction mixture of step b) and said sultone reacting with said anionic nitrogen of said polyaniline;

d) adding the resulting reaction mixture of step c) into an aqueous solution containing a protonic acid to form a precipitate;

e) removing said precipitate from the resulting mixture of step d);

f) dissolving said precipitate of step e) in an alkaline aqueous solution;

g) purying the resulting aqueous solution from step f) by subjecting it to a purifying treatment, such as a dialysis treatment with a semipermeable membrane in deionized water, to remove excess alkali in said alkaline aqueous solution;

h) contacting the resulting purified aqueous solution of step g) with a H$^+$-type ion-exchange resin to form an aqueous solution containing a polyaniline having the following formula (I):

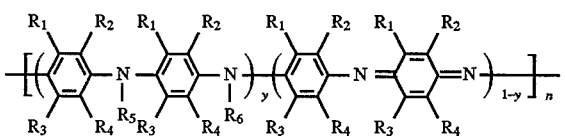

wherein $R_1$, $R_2$, $R_3$, $R_4$, y and n are defined in the above formula (A); $R_5$ and $R_6$ are independently —H or —R$_8$SO$_3$H, wherein $R_8$ is C$_3$-C$_5$ alkylene or —CHR$_9$—CR$_{10}$=CR$_{11}$—CH$_2$—, wherein $R_9$, $R_{10}$ and $R_{11}$ are independently —H or alkyl, wherein at least a fraction of $R_5$ and $R_6$ in the repeating units of formula (I) are —R$_8$SO$_3$H, and said fraction ranges from 10 to 99 mol %. Please note that the formula (I) shown is in the undoped state for simplicity.

Preferably, $R_1$, $R_2$, $R_3$, and $R_4$ are all hydrogen.
Preferably, y is 0.5.
Preferably, $R_8$ is C$_3$-C$_5$ alkylene.
Preferably, the fraction of $R_5$ and $R_6$ in the repeating units of formula (I) being —R$_8$SO$_3$H ranges from 90 to 99 mol %.

Prior to contacting the purified aqueous solution with an H$^+$-type ion-exchange resin in step h), the present process may further comprise drying the resulting purified aqueous solution of step g) by evaporation to obtain a solid, and dissolving said solid in deionized water to form an aqueous solution which is then contacted with a H$^+$-type ion-exchange resin.

Preferably, the present process further comprises a step i) evaporating water from said aqueous solution containing said polyaniline of formula (I) of step h) to form a concentrated aqueous solution thereof. Said concentrated aqueous solution of said polyaniline of formula (I) can be casted or coated onto a substrate to form a self-acid-doped polyaniline film of formula (I). Once the polyaniline of formula (I) is casted or coated to form a solid film, it is no longer water soluble. Therefore, the water soluble self-acid-doped polyaniline of formula (I) is preferably stored in the form of an aqueous solution, and most preferably an concentrated aqueous solution.

Said organic solvent used in step a) can be dimethylsulfoxide (DMSO), N-methyl-2-pyrrolidone (NMP) or dimethylformamide (DMF).

Said sultone used in step c) can be

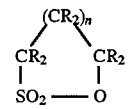

n=1, 2, or 3; R=H, or alkyl

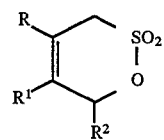

R=R$^1$=R$^2$=H; or
R=R$^1$=H, R$^2$=Me; or
R=R$^1$=Me, R$^2$=H; or
R=Et C: CHCH$_2$CH$_2$, R$^1$=R$^2$=H, wherein Me is methyl and Et is ethyl.

The reaction in step b) and c) can be carried out at a temperature ranging from room temperature to 100° C.

Said protonic acid used in step d) can be HCl, HClO$_4$, HBF$_4$ or H$_2$SO$_4$.

Said alkaline aqueous solution used in step f) can be an aqueous solution of NaOH, KOH or NH$_4$OH.

Said purifying treatment in step g), in addition to dialysis treatment, may include any suitable treatment which can remove excess alkali from the alkaline aqueous solution containing the dissolved precipitate of step f), for example

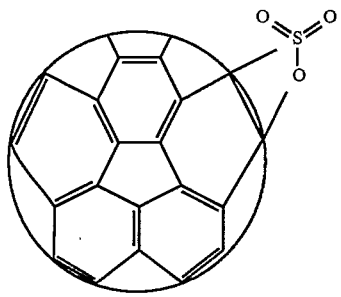

H⁺-type ion exchange treatment. The excess alkali means the cation of the alkali dissolved in the alkaline aqueous solution which is not attracted by the anionic sulfonic acid group, i.e. the amount of alkali exceeding the stoichmetric amount for undoping the protonic acid doped polyaniline.

The present invention also provides a self-acid-doped polyaniline aqueous solution and a film formed from said aqueous solution, in which said self-acid-doped polyaniline has a structure defined as the above formula (I), in which $R_1$, $R_2$, $R_3$, and $R_4$ are preferably all hydrogen; y is preferably 0.5; $R_8$ is preferably $C_3$-$C_5$ alkylene; and the fractions of $R_5$ and $R_6$ in the repeating units of formula (I) being —$R_8SO_3H$ preferably range from 90 to 99 mol %.

A suitable water soluble polymer or polymer emulsion can be easily mixed with the aqueous solution of the self-acid-doped polyaniline of formula (I) to form a polymer blend, in which the mixing ratio of said suitable water soluble polymer ranges from 5 to 95% based on the total weight of the polymers. Said suitable water soluble polymer is selected from the group consisting of poly(ethylene oxide) (PEO), poly(vinyl methyl ether) (PVME), poly(ethylene imine) (PEI) and its esters, poly(acrylic acid) (PAA) and its esters, polyacrylamide (PAAm), poly(methacrylic acid) (PMAA) and its esters, polymethacrylamide (PMAAm), poly(N,N-dimethylacrylamide), poly(N-isopropylacrylamide) (PIPAAm), poly(N-acrylylglycinamide) (PAG), poly(N-methacrylylglycinamide) (PMAG), acrylic copolymers, poly(vinyl alcohol) (PVA), poly(vinyl acetate) (PVAc), poly (vinyl acetate-co-vinyl alcohol) (PVAA), polyvinylpyrrolidone (PVP), poly(styrene sulfonic acid) (PSSA) and its esters, poly(ethylenesulfonic Acid) (PESA) and its esters, poly(phosphoric acid) (PPA) and its salts, poly(silicic acid) (PSiA) and its salts, polyvinylamine (PVAm), poly(2-vinylpyridine) (P2VP) and its salts, poly(4-vinylpyridine) (P4VP) and its salts, poly(vinyl sulfuric acid) (PVSA) and its salts, poly(vinyl alcohol-co-vinyl sulfuric acid and its salts, poly(diallyldimethylammonium chloride), poly (vinylphosphonic acid) and its salts, poly(maleic acid) and its salts, poly(2-methacryloyloxyethane-1-sulfonic acid) and its salts, poly(3-methacryloyloxypropane-1-sulfonic acid) and its salts, poly(4-vinylbenzoic acid) and its salts, poly(4-vinylbenzyltrimethylammonium salts), poly[3-(vinyloxy) propane-1-sulfonic acid] and its salts, poly(4-vinylphenol) and its salts, poly(2-vinylpiperidine) and its salts, poly(4-vinylpiperidine) and its salts, and poly(N-vinylsuccinamidic acid) and its salts.

The self-acid-doped polyaniline of formula (I) and said polymer blend can be in the form of an aqueous solution, a film coated on a substrate or an oriented film, a filament or powder.

The invention will be further illustrated by the following examples which are only meant to illustrate the invention, but not to limit it. In the following examples the polymers of formulas (II) to (V) were synthesized:

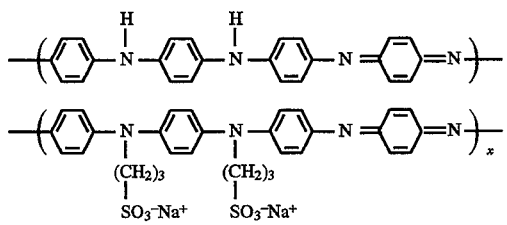

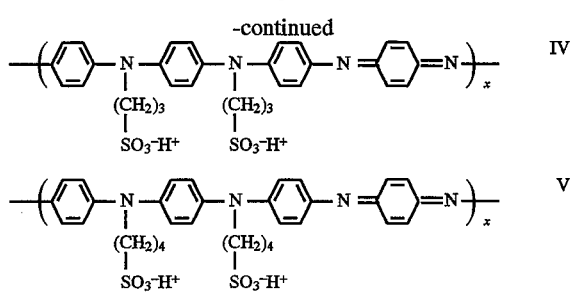

EXAMPLE 1: Preparation of Emeraldine Base Form of Polyaniline (PAn)

The emeraldine base form of polyaniline (PAn, polymer II) was synthesized by a chemical oxidation method similar to that of MacDiarmid and co-workers [Chiang, J. C.; MacDiarmid, A. G. Synth. Met. 1986, 13, 193–205].

To 200 mL 1M HCl aqueous solution 9.3 mL aniline monomer was added. To another 200 1M HCl aqueous solution 34.23 g $(NH_4)_2S_2O_8$ oxidant was added. The oxidant solution was added dropwise to the monomer solution in an ice bath while stirring and introducing nitrogen therein. The reaction was carried out for 9 hours, the resulting polyaniline precipitate was separated from the reaction mixture by filtration, and washed with 1M HCl aqueous solution and deionized water until the filtrate became colorless. The washed polyaniline was undoped by introducing into 1M $NH_4OH$ aqueous solution. The mixture was stirred for 24 hours and the insoluble polyaniline was separated by filtration, and washed with deionized water until the filtrate become neutral. The washed polyaniline was dried under vacuum for 48 hours or more to obtain an undoped polyaniline (PAn) powder of formula (II).

The emeraldine base so obtained has an oxidation level of about 0.5 as determined from its N (1 s) core level spectrum obtained using X-ray photoelectron spectroscopy (XPS), which can be deconvoluted into two peaks with approximately equal areas, one centered at 398.3±0.1 eV (due to the imine nitrogen) and the other located at 399.4±0.1 eV (due to the amine nitrogen). Gel permeation chromatography (GPC) analysis with N-methyl-2-pyrrolidone (NMP) as eluent exhibits a bimodel molecular weight distribution. For the high-molecular-weight fraction, the weight average molecular weight is about $1 \times 10^6$, and for the low-molecular-weight fraction, about 1100, as compared with polystyrene standards.

EXAMPLE 2: Preparation of Poly(aniline-co-sodium N-propanesulfonate Aniline) (PAPSANa)

The dried PAn (2.26 g) prepared in Example 1 was reacted with excess NaH (0.9 g) in dried dimethyl sulfoxide (DMSO) at about 45° C. under a dried nitrogen atmosphere for 6 hours to give a green-black solution, in which the original emeraldine base was probably converted to an emeraldine base without H on nitrogen (anionic nitrogen). The solution was subsequently reacted with excess 1,3-propanesultone (4.57 g) for 20 hours at room temperature to give a blue-black solution. The resulting solution was precipitated with 1M HCl aqueous solution, and the green precipitate (HCl-doped PAPSAH) after filtration was washed by a large amount of acetonitrile and then undoped with a NaOH aqueous solution to yield a blue solution, which was then purified by dialysis with semipermeable membrane (Spectra/Por 3 membrane, molecular weight cutoff, 3500) in deionized (DI) water, which was replaced with fresh DI water frequently for 3 days. The polyaniline-co-sodium N-propanesulfonate aniline) (PAPSANa, polymer III) aqueous solution so obtained was concentrated in a vacuum evaporator at a temperature below 40° C. A PAPSANa film can be obtained by casting from this concentrated solution.

FIG. 1 shows the IR spectra of the PAn (curve a) and PAPSANa (curve b). The IR spectrum of the PAPSANa shows that the ratio of the absorption intensity at 1589 cm$^{-1}$ (due to the quinoid ring) to that at 1498 cm$^{-1}$ (due to the benzenoid ring) is the same as the corresponding ratio in the emeraldine base PAn before reacting with propanesultone, indicating an oxidation level of about 0.5. This also indicates that 1,3-propanesultone does not give an oxidation reaction during the synthesis of PAPSANa. The presence of the absorption peaks at 1172 and 1044 cm$^{-1}$ are characteristic of the asymmetric and symmetric O=S=O stretching vibrations, respectively, and the absorption band at 800–600 cm$^{-1}$ characteristic of stretching modes of C—S and S—O groups indicate the existence of $SO_3$—groups. The presence of an absorption peak at 829 cm$^{-1}$ (as in the case of the emeraldine base) characteristic of the C—H out-of-plane bending vibrations of the 1,4-disubstituted benzene ring, together with the absence of a splitting of this peak into the two peaks at 820 and 870 cm$^{-1}$ (which occurs in the case of sulfonic acid ring-substituted PAn, indicates that no ring substitution occurs in the present PAn derivative. The presence of an absorption peak at 1268 cm$^{-1}$ characteristic of the $C_{aliphatic}$—N group, together with the presence of the $SO_3$—group as stated above, shows that the alkanesulfonic acid groups are linked on the amine nitrogen.

The $^1$H NMR spectrum of the PAPSANa shows a broad peak around 6.6 ppm, characteristic of the aromatic protons, a peak at 3.6 ppm$^1$ characteristic of the protons of the methylene of the $CH_2CH_2CH_2SO_3Na$ group bound to the nitrogen, and peaks at 2.0 and 2.9 ppm characteristic of the protons of the next methylene group and the methylene group bound to the sulfur atom, respectively. These results indicate the presence of alkanesulfonic acid groups in the resulting PAn derivative, which is consistent with the IR results.

EXAMPLE 3: Preparation of Poly(aniline-co-N-propanesulfonic Acid Aniline) (PAPSAH)

The polymer, PAPSANa, prepared in Example 2 was converted to poly(aniline-co-N-propanesulfonic acid aniline) (PAPSAH, polymer IV) by dissolving it in DI water and then exchanging Na$^+$ for H$^+$ using H$^+$-type ion-exchange resin (IR 120H resin from Rohm and Haas Co., U.S.) to give a PAPSAH aqueous solution green in color. A PAPSAH free-standing film can be obtained by casting from a concentrated PAPSAH aqueous solution: however, the film is hard and brittle, since it is in the doped state.

Elemental analysis for PAPSAH gives a S/N atomic ratio of 0.48, which implies that almost each amine nitrogen (about 50% of the total nitrogen) in the polymer is linked with a side chain of alkanesulfonic acid.

Figure 2:
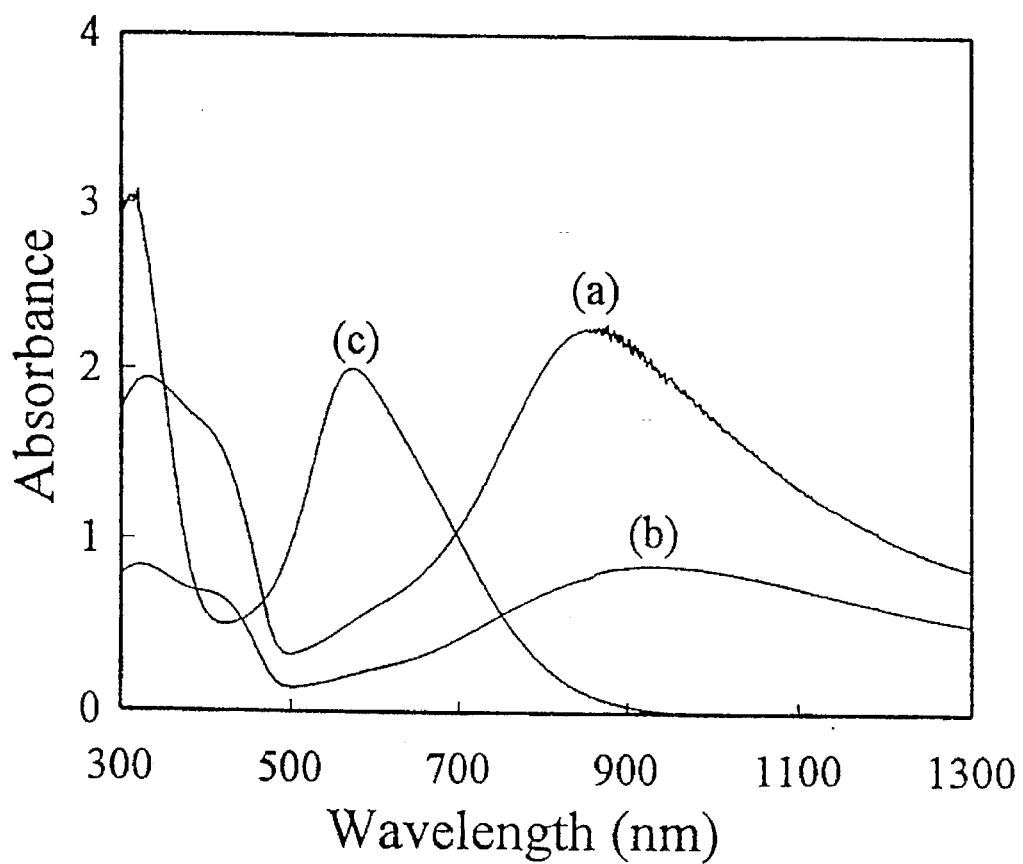
FIG. 2 shows UV-vis spectra of poly(aniline-co-sodium N-propanesulfonic acid aniline) in aqueous solution (curve a), as solid film coated on a glass substrate (curve b), and in aqueous solution neutralized with ~2% NaOH aqueous solution (curve c).
Figure 3:
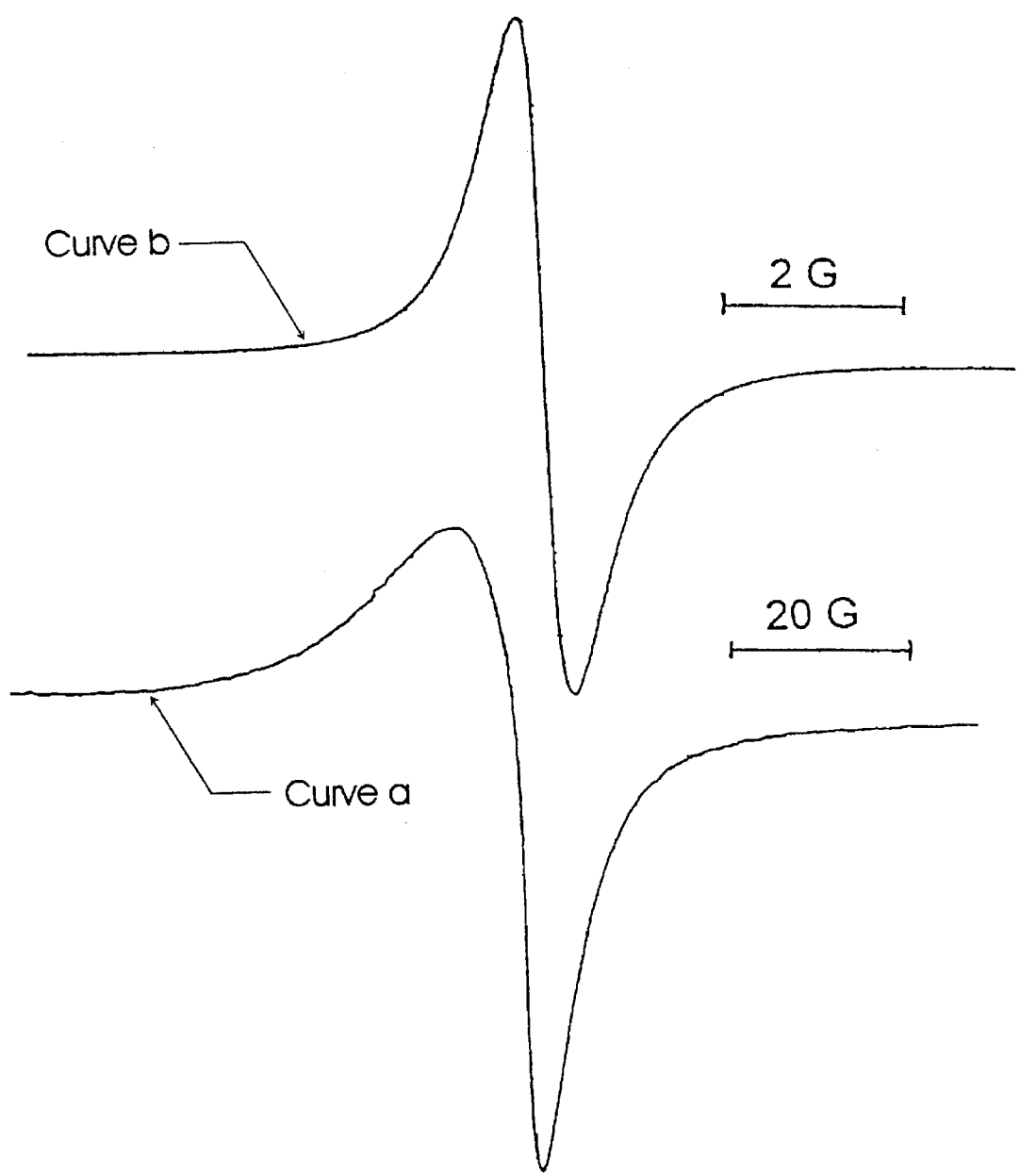
FIG. 3 shows electron spin resonance (ESR) spectra of poly(aniline-co-sodium N-propanesulfonic acid aniline) in the form of aqueous solution (curve a), and as solid film (curve b).

The free-standing film of PAPSANa has a conductivity of 1.3×10$^{-6}$ S/cm, while the pressed pellet and thin film coated on a glass plate of the PAPSAH have conductivity of 15×10$^{-2}$ and 3×10$^{-2}$ S/cm in vacuum at room temperature, respectively. The conductivity was measure by four-point probe method. This PAPSAH is in the doped state, as can be confirmed by the electronic spectra of its aqueous solution and thin solid film coated on a glass plate (FIG. 2, curves a and b), which exhibit a π—π* transition of the benzenoid rings at 330 nm and polaron/bipolaron band transitions at about 400 and 860 nm for the solution and 420 and 910 nm for the film. As the PAPSAH aqueous solution was converted to PAPSANa by neutralization with ~2% of NaOH (aqueous), the polaron/bipolaron bands disappear and a strong exciton transition of the quinoid rings at 573 nm grows at the same time (FIG. 2, curve c). Furthermore, the electron spin resonance (ESR) measurement on the aqueous solution of PAPSAH (FIG. 3, curve a) gives an asymmetric ESR signal with a g value of 2.0042 and a peak-to-peak line width $\Delta H_{pp}$ of 10.8 G, and that on the film of PAPSAH (FIG. 3, curve b) gives a symmetric ESR signal with $\Delta H_{pp}$=0.9 G and a spin density of about 6.2×10$^{19}$ spin/g and g=2.002865 (both values being rather close to those of HCl-doped PAn (2.2×10$^{20}$ spin/g, g=2.002868)). The presence of free spins indicates that polarons exist in the self-doped PAPSAH in both the aqueous solution and solid films. Thus, in the self-doped polymer of the present invention the alkanesulfonic acid bound on the side chain attached to the amine nitrogen protonates ("dopes") the imine nitrogen atom to make the polymer conducting.

EXAMPLE 4: Preparation of poly(aniline-co-N-butanesulfonic acid aniline) (PABSAH)

The procedures used to prepare poly(aniline-co-N-butanesulfonic acid aniline) (PABSAH) are similar to those in Examples 2 and 3. The dried PAn (2.26 g) was reacted with excess NaH (0.9 g) in 100 mL dried dimethyl sulfoxide (DMSO) at about 45° C. under a dried nitrogen atmosphere for 6 hours. The solution was subsequently reacted with excess 1,4-butanesultone (5.09 g) for 20 hours at room temperature. The resulting solution was precipitated with 1M HCl aqueous solution (500 mL), and the precipitate (HCl-doped PABSAH) after filtration was washed by a large amount of acetonitrile and then undoped with a NaOH aqueous solution, which was then filtered and the resulting filtrate was purified by dialysis with semipermeable membrane in deionized (DI) water, which was replaced with fresh DI water frequently for 3 days. The polyaniline-co-sodium N-butanesulfonate aniline) (PABSANa) aqueous solution so obtained was concentrated in a vacuum evaporator at a temperature below 40° C. A PABSANa film can be obtained by casting from this concentrated solution.

The polymer, PABSANa, was converted to poly(aniline-co-N-butanesulfonic acid aniline) (PABSAH, polymer V) by dissolving it in DI water and then exchanging Na$^+$ for H$^+$ using H$^+$-type ion-exchange resin to give a PABSAH aqueous solution. A PABSAH free-standing film can be obtained by casting from a concentrated PABSAH aqueous solution. The free-standing film of PABSAH has a conductivity of 3×10$^3$ S/cm in vacuum at room temperature by four-point probe method.

EXAMPLE 5: Preparation of PVA/PAPSAH Polymer Blend Film 0.025 g/mL polyvinyl alcohol (PVA) aqueous solution was prepared by using a polyvinyl alcohol having a weight average molecular weight of 1.0×10$^5$ and a hydrolysis degree of 86–89% which is sold under a code BP-17 from Chang Chun Plastics Co., Ltd., Taiwan. A PAPSAH aqueous solution having a solid content of 0.025 g/mL was prepared by using the PAPSAH aqueous solution prepared in Example 3. Each polymer solution was measured 5 mL which were then well mixed with each other. The mixture was coated on a glass substrate to form a film. The conductivity of the film was measured by four-point method and has a value of $1.3 \times 10^{-3}$ S/cm.

EXAMPLE 6: Preparation of PEO/PAPSAH Polymer Blend Film 0.0125 g/mL polyethylene oxide (PEO) aqueous solution was prepared by using a polyethylene oxide having a weight average molecular weight of $4.0 \times 10^6$ which is available from Polyscience, Inc., U.S.A.. A PAPSAH aqueous solution having a solid content of 0.025 g/mL was prepared by using the PAPSAH aqueous solution prepared in Example 3. Each polymer solution was measured 10 mL which were then well mixed with each other. The mixture was coated on a glass substrate to form a film. The conductivity of the film was measured by four-point method and has a value of $1 \times 10^{-3}$ S/cm.

EXAMPLE 7: Preparation of PVAc/PAPSAH Polymer Blend Film

A polyvinyl acetate (PVAc) emulsion having a solid content of 0.25 g/mL was prepared by using a polyvinyl acetate having an average particle diameter of 1 μm which is sold under a code PE-160 from Chang Chun Plastics Co., Ltd., Taiwan. A PAPSAH aqueous solution having a solid content of 0.025 g/mL was prepared by using the PAPSAH aqueous solution prepared in Example 3. The former was measured 1 mL and the latter was measured 10 mL, which were then well mixed with each other. The mixture was coated on a glass substrate to form a film. The conductivity of the film was measured by four-point method and has a value of $1.5 \times 10^{-3}$ S/cm.

Having thus described the present invention, which is now deemed appropriate for Letters Patent, is set out in the following appended claims.

What is claimed is:

1. A process for preparing a water-soluble self-acid-doped polyaniline comprising the following steps:

a) dissolving a polyaniline having formula (A) as follows in an organic solvent:

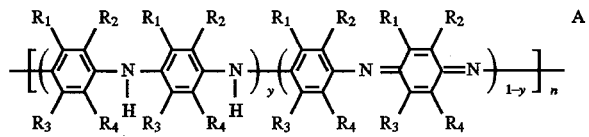

wherein $R_1$, $R_2$, $R_3$, $R_4$ are independently —H, —$CH_3$, —$C_2H_5$, —$C_3H_7$, —$OR_7$, —$SR_7$, —F, —Cl, —Br, —I, —$COR_7$, —$NHCOR_7$, —$NO_2$, —$COOR_7$ or —CN, wherein $R_7$ is a lower alkyl, aryl or aryl(lower alkyl);
$0 < y < 1$; and
n is an integer equal to or greater than 2;

b) adding a strong base into the resulting organic solution of step a), and said strong base reacting with the polyaniline so that the amino nitrogen of said polyaniline is converted to anionic nitrogen;

c) adding sultone into the resulting reaction mixture of step b) and said sultone reacting with said anionic nitrogen of said polyaniline;

d) adding the resulting reaction mixture of step c) into an aqueous solution containing a protonic acid to form a precipitate;

e) removing said precipitate from the resulting mixture of step d);

f) dissolving said precipitate of step e) in an alkaline aqueous solution;

g) purifying the resulting aqueous solution of step f) by subjecting to a purifying treatment to remove excess alkali in said alkaline aqueous solution;

h) contacting the resulting purified aqueous solution of step g) with a $H^+$-type ion-exchange resin to form an aqueous solution containing a polyaniline having the following formula (I):

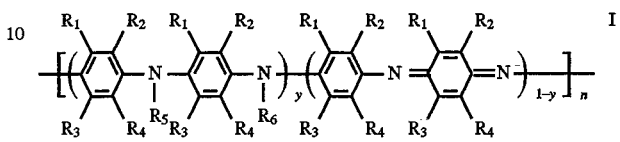

wherein $R_1$, $R_2$, $R_3$, $R_4$, y and n are defined as in the above formula (A); $R_5$ and $R_6$ are independently —H or —$R_8SO_3H$, wherein $R_8$ is $C_3$-$C_5$ alkylene or —$CHR_9$—$CR_{10}=_{CR_{11}}$—$CH_2$—, wherein $R_9$, $R_{10}$ and $R_{11}$ are independently —H or alkyl, wherein at least a fraction of $R_5$ and $R_6$ in the repeating units of formula (I) are —$R_8SO_3H$, and said fraction ranges from 10 to 99 mol %.

2. A process in accordance with claim 1, wherein said organic solvent used in step a) is dimethylsulfoxide (DMSO), N-methyl-2-pyrrolidone (NMP) or dimethylformamide (DMF).

3. A process in accordance with claim 1, wherein said strong base used in step b) is NaH or alkali metal hydroxides.

4. A process in accordance with claim 1, wherein said sultone used in step c) is

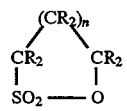

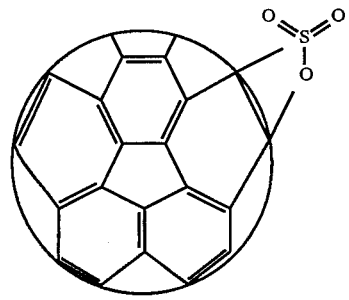

n=1, 2, or 3; R=H, or alkyl

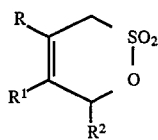

R=R¹=R²=H; or

R=R¹=H, R²=Me; or

R=R¹=Me, R²=H; or

R=Et C: CHCH₂CH₂, R¹=R²=H, wherein Me is methyl and Et is ethyl.

5. A process in accordance with claim 1, wherein the reaction in step b) and c) are carried out at a temperature ranging from room temperature to 100° C.

6. A process in accordance with claim 1, wherein said protonic acid used in step d) is HCl, HClO₄, HBF₄ or H₂SO₄.

7. A process in accordance with claim 1, wherein said alkaline aqueous solution used in step f) is an aqueous solution of NaOH, KOH or NH₄OH.

8. A process in accordance with claim 1, wherein said purifying treatment used in step g) is a dialysis treatment with a semipermeable membrane in deionized water.

9. A process in accordance with claim 1, wherein said $R_1$, $R_2$, $R_3$, and $R_4$ are all hydrogen.

10. A process in accordance with claim 1, wherein said y is 0.5.

11. A process in accordance with claim 1, wherein said $R_8$ is $C_3$-$C_5$ alkylene.

12. A process in accordance with claim 1, wherein said fraction of $R_5$ and $R_6$ in the repeating units of formula (I) being —$R_8SO_3H$ ranges from 90 to 99 mol %.

13. A process in accordance with claim 1 which further comprises a step i) evaporating water from said aqueous solution containing said polyaniline of formula (I) of step h) to form a concentrated aqueous solution thereof.

14. A process in accordance with claim 1, in which the resulting purified aqueous solution of step g) is dried by evaporation to obtain a solid, and said solid is dissolved in deionized water to form an aqueous solution prior to contacting with said H⁺-type ion-exchange resin in step h).

15. A process in accordance with claim 1, wherein said purifying treatment used in step g) is H⁺-type ion exchange treatment.

* * * * *